United States Patent [19]

Niwa et al.

[11] 4,443,078
[45] Apr. 17, 1984

[54] DISTANCE DETECTING DEVICE IN A CAMERA

[75] Inventors: Yukichi Niwa; Yasuo Ogino; Mitsutoshi Ohwada, all of Yokohama; Kazuo Tanaka, Tokyo; Noboru Koumura, Narashino, all of Japan

[73] Assignee: Canon Kabushiki Kaisha, Tokyo, Japan

[21] Appl. No.: 362,253

[22] Filed: Mar. 26, 1982

[30] Foreign Application Priority Data

Mar. 31, 1981 [JP] Japan ................................. 56-47614

[51] Int. Cl.$^3$ .......................... G03B 3/00; H04N 5/26; G01C 3/08
[52] U.S. Cl. ..................................... 354/403; 358/227; 356/4; 354/408
[58] Field of Search ................. 354/25 R, 25 A, 25 P, 354/25 N, 31 F, 162, 163, 167, 197; 356/1, 4; 250/201, 204; 358/227; 352/140

[56] References Cited

U.S. PATENT DOCUMENTS 4,004,852  1/1977  Pentecost ................................ 356/1
4,160,587  7/1979  Heiniger et al. .................. 354/25 P

*Primary Examiner*—William B. Perkey
*Attorney, Agent, or Firm*—Fitzpatrick, Cella, Harper & Scinto

[57] ABSTRACT

This specification discloses a distance detecting device in a camera for detecting the relative positional relation between two detection images of an object obtained by two optical systems spaced apart from each other by a predetermined base length, to thereby enable the distance from the camera to the object to be known, characterized in that the picture-taking optical system of the camera is used also as one of the optical systems.

25 Claims, 12 Drawing Figures

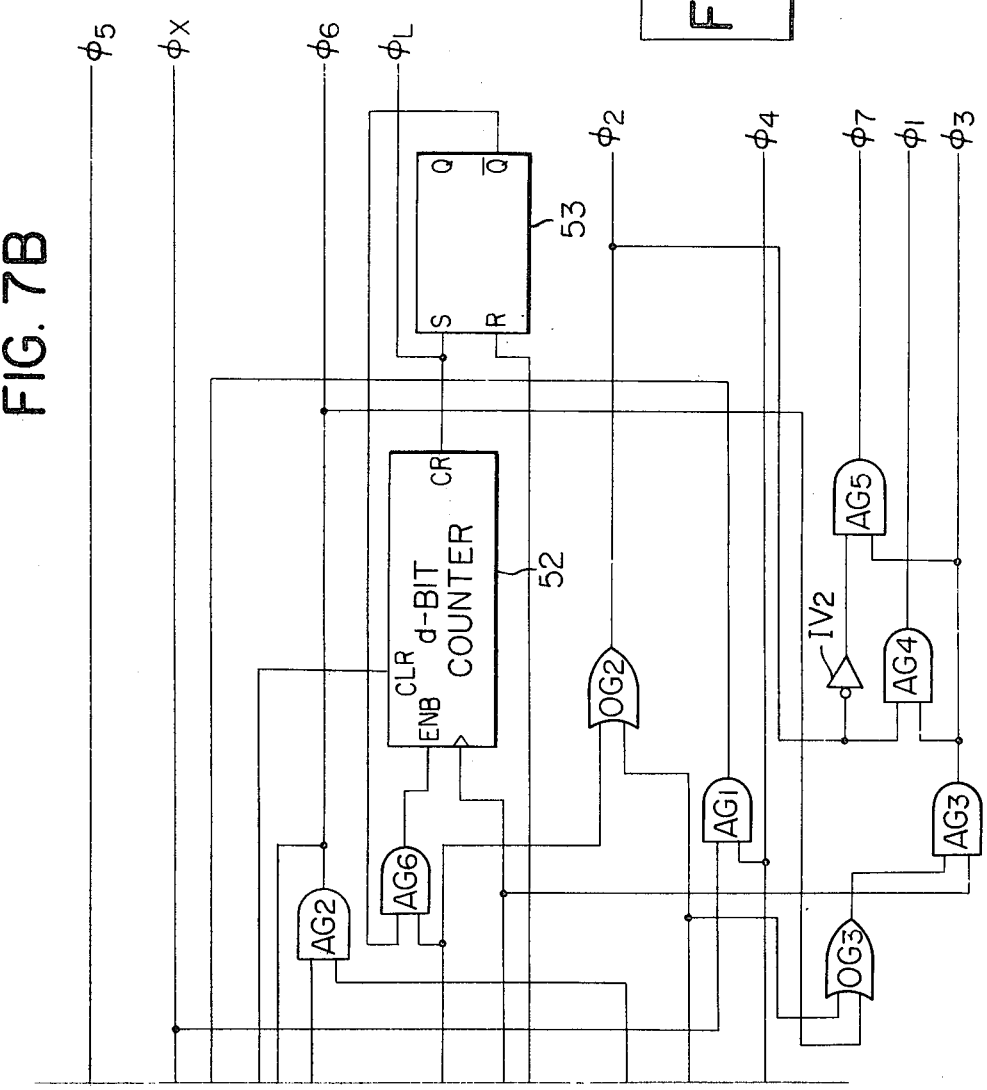

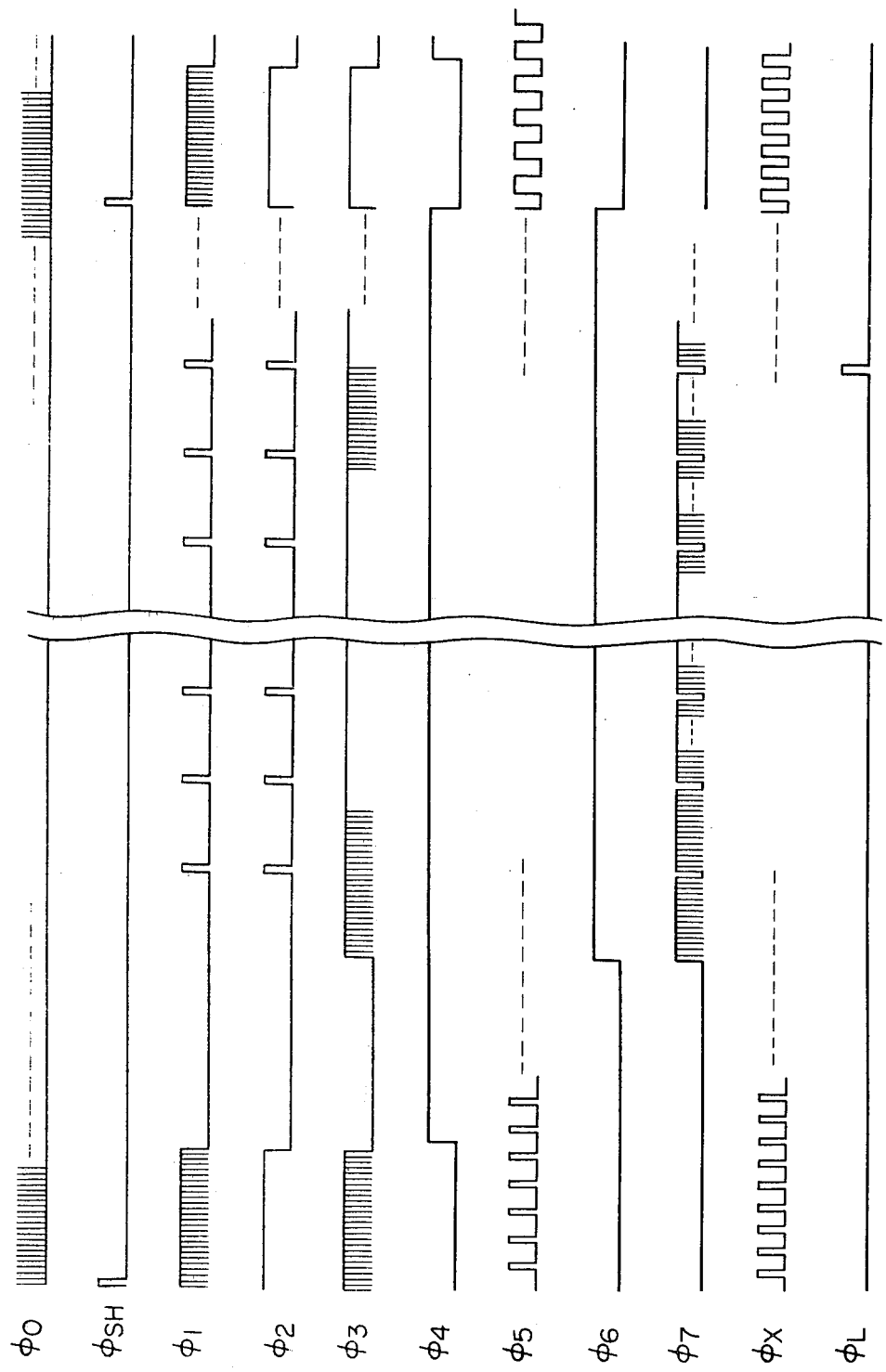

DISTANCE DETECTING DEVICE IN A CAMERA

BACKGROUND OF THE INVENTION

1. Field of the Invention

This invention relates to a distance detecting device in a photographing apparatus such as a movie camera, a still camera or a TV camera, and more particularly to a distance detecting device in a camera which adopts the distance measuring principle of the base line type range finder to electrically detect the relative positional relation between two images to thereby enable the distance from the camera to an object to be known.

2. Description of the Prior Art

A variety of electrical two-image relative position detecting type distance detecting devices have heretofore been proposed. As a typical example thereof, U.S. Pat. No. 4,004,852 discloses a distance detecting device in which two detection images of an object formed with an imaged position deviation corresponding to the distance to the target object by a pair of fixedly disposed imaging optical systems are received by a pair of or one photosensor array device and at this time, binary-form-transformed picture element signal rows from individual photosensors for one image are successively shifted relative to binary-form-transformed picture element signal rows from individual photosensors for the other image and, in the process of the relative shift of the binary-form-transformed picture element signal rows, the coincidence or incoincidence of each binary-form-transformed picture element signal row with the two images is detected, and the amount of relative shift of the binary-form-transformed picture element signal rows from the start of the shift until the binary-form-transformed picture element signal rows can be regarded as being substantially coincident with the images, whereby this amount of shift of the binary-form-transformed picture element signal rows is used as the information of the distance to the target object.

The distance detecting device of this type can provide an automatic focus adjusting system of high performance by being incorporated into a camera while, on the other hand, it suffers from the following problems due to the construction thereof. That is, in the device of this type, two optical systems for constituting a picture-taking optical system and a range-finding optical system are entirely independent of each other and therefore, the optical axis of one optical system for imaging the view field which provides the standard for distance detection and the optical axis of the picture-taking optical system must unavoidably be disposed with some distance therebetween and therefore, it is very difficult to make the picture-taking field of the picture-taking optical system and the standard field of the distance detecting device exactly coincident with each other, and thus there is parallax which is generally questionable as a disadvantage of such distance detecting device.

Also, where such distance detecting device is applied to a photographing apparatus such as a camera, a range-finding optical system comprising two optical systems must be installed around the picture-taking optical system and this leads to a great volume and heavy weight of the apparatus which are great limitations in the design of the photographing apparatus. Furthermore, where two images are to be formed in a predetermined positional relationship on the surface of a pair of or one photosensor array device, much effort must be made to adjust the range-finding optical system, and this makes the operation for adjustment very cumbersome and the photographing apparatus expensive.

SUMMARY OF THE INVENTION

The present invention has been made in view of the above-noted situations and its primary object is to provide a novel distance detecting device in a camera which eliminates all of the above-noted disadvantages which may arise when the above-described distance detecting device heretofore proposed is used in a camera, that is, the distance detection error as viewed from the picture-taking optical system which is attributable to the parallax necessarily created by being provided with a range-finding optical system separately from the picture-taking optical system, the bulkiness and complexity of the construction which results from the installation of a range-finding optical system including a pair of optical systems around the picture-taking optical system, and the high cost attributable to the complicated adjustment, and which has no optical parallex relative to the picture-taking optical system and which is simplified in construction to thereby facilitate the adjustment and which causes very little distance detection error and can ensure distance measurement of high accuracy.

With such object, according to the present invention, there is provided a distance detecting device in a camera in which the relative positional relation between two detection images of an object obtained by two optical systems spaced apart from each other by a predetermined base length is detected to thereby enable the distance from the camera to the object to be known, characterized in that the picture-taking optical system of the camera is used also as one of the two optical systems.

A specific example of the construction of such distance detecting device in a camera will be described with respect to an embodiment of the present invention which will hereinafter become apparent. A detection image obtained by the picture-taking optical system is used as the standard image and a detection image obtained by the other range-finding optical system is used as the reference image, and the relation between said two optical systems is set so that the image position of the standard image is substantially invariable independently of the object distance while the image position of the reference image is varied in accordance with the object distance, and the relative positional relation of the reference image with respect to the standard image is detected to thereby enable the distance from the camera to the object to be known. More specifically, a scanning type image pickup element disposed on the predetermined imaging plane of the picture-taking optical system or a scanning type image pickup element installed on a plane conjugate with said predetermined imaging plane is used as a first photosensor array device, and a scanning type image pickup element disposed on the predetermined imaging plane of the other range-finding optical system laterally spaced apart with respect to the picture-taking optical system by a predetermined base length is used as a second photosensor array device, and an image of the same target object is formed on the surface of each of the sensors and if, at that time, a limited area in the sensor surface of the first photosensor array device is defined as a predetermined view field which is the standard field, the image in the standard field which is equivalent to the target object image is formed on the sensor surface of the second photosensor array device with an imaging position deviation corresponding to the object distance by said other optical system fixedly disposed with the predetermined base length with respect to the picture-taking optical system. If a limited area in the sensor surface of the second photosensor array device (this area includes and is larger than the standard field) is defined as the reference field as opposed to the standard field, what position in the image signal row of the reference field put out from the second photosensor array device is occupied by a signal row equivalent to the image signal row of the standard field put out from the first photosensor array device may be detected to know said amount of deviation which can be used as the information of the distance to said target object and, when such detection is effected, the target object is always caught in the standard field and an image signal corresponding to the target object image is put out from the first photosensor array device, whereby there is obtained distance information including no parallax.

According to a preferred embodiment which will hereinafter be described, a contrivance for the compensation concerning the magnification between a detection image obtained through the picture-taking optical system (the standard image) and a detection image obtained through the other range-finding optical system (the reference image) is proposed, and this may be an important element in ensuring distance detection of high accuracy irrespective of the differences in F-No. and focal length between the two optical systems. Particularly, it is an indispensable element in maintaining the distance detection accuracy stably where a magnification changing optical system (a zoom lens) is utilized as the picture-taking optical system or where various optical systems are interchangeably used.

Also, as shown in the embodiment, the device of the present invention offers very great advantages when it is applied to a TV camera or a video camera. It is because the detection image which should provide the standard to be obtained through the picture-taking optical system may be obtained by utilization of the TV signal in the TV camera or the video camera or the output from video signal generating image pickup means.

Also, as shown in the embodiment, the view field of the standard detection image obtained through the picture-taking optical system lies in the central portion of the photographed image and accordingly, it is advantageous to make such a design that the said view field matches the central portion of the viewfinder frame of the camera and this is for the reason that generally, an object to which focusing is desired is often positioned in the central portion of the viewfinder frame.

Other objects and features of the present invention will become apparent from the following detailed description of the invention taken in conjunction with the accompanying drawings.

BRIEF DESCRIPTION OF THE DRAWINGS

FIG. 8 is a timing chart showing the various pulses formed by the circuit shown in FIG. 7.

DESCRIPTION OF THE PREFERRED EMBODIMENTS

Figure 1:
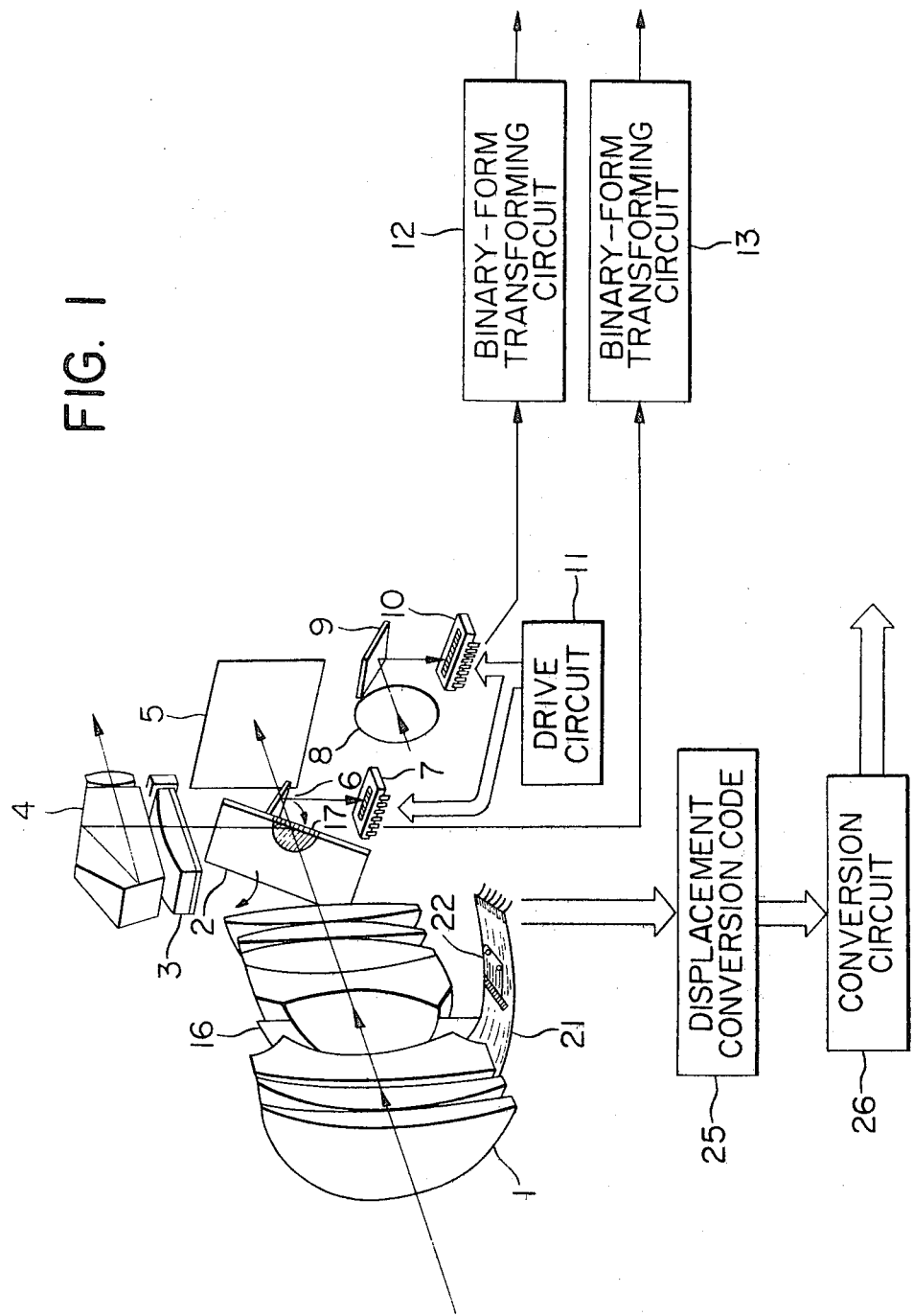
FIG. 1 is a perspective view partly in cross section schematically showing particularly the optical construction of an embodiment in which the present invention is applied to a single lens reflex camera.

Reference is first had to FIG. 1 to describe an example of the case where the device of the present invention is applied to a single lens reflex camera. In FIG. 1, reference numeral 1 designates a picture-taking lens whose cross section is shown in perspective view. The light from an object to be photographed passed through the picture-taking lens 1 is reflected by a quick return mirror 2 and imaged on a focusing glass 3. Reference numeral 4 denotes a viewfinder optical system for observing therethrough an object image formed on the focusing glass 3, and reference numeral 5 designates a film surface. At least the central portion of the mirror 2 is formed with a transmitting or half-transmitting property, and the light beam in the center portion passes through said central portion, whereafter it is totally reflected by a total reflection mirror 6 installed behind it and is imaged on the sensor surface of a first photosensor array device 7. The first photosensor array device 7 is installed at a position whereat the light beam of the central portion of the viewfinder field observed in the viewfinder optical system 4 is imaged, and is fixedly disposed in a plane conjugate with the film 5 and the surface of the focusing glass 3. That is, a target object viewed through the viewfinder optical system 4 is imaged at the same time on the sensor surface of the first photosensor array device 7 without optical parallax.

During photographing, the mirror 2 jumps up in the direction of arrow and along therewith, the total reflection mirror 6 is folded, for example, in the direction of arrow and contained in the back of the mirror 2. Even if the direction in which the total reflection mirror 6 is contained is opposite to that in the present example, there is no substantial difference but it is a matter to be determined by the convenience of design. However, at least the central transmitting or half-transmitting portion of the mirror 2 must have its back formed as an optically smooth surface and therefore, when, during photography, the mirror 2 has jumped up and has been contained so as to shield the surface of the focusing glass 3, the light conversely passed through the viewfinder optical system 4 may pass through the central transmitting or half-transmitting film of the mirror 2 and reach the film surface 5 as stray light. Also, since the back of the central portion of the mirror 2 is a smooth surface, the light reflected by this portion may become stray light which may cause an adverse effect such as ghosting, flare, halation or the like. To prevent such adverse effects, the total reflection mirror 6 installed on the back of the mirror 2 is of such a size as to fully shield the transmitting or half-transmitting portion and, as a construction in which the back thereof was subjected to a reflection preventing treatment, it is practically more effective for the total reflection mirror to be contained in the direction of the arrow as shown in FIG. 1. From a viewpoint similar to the reason set forth above, it is particularly important in practice to shield the sensor surface of the photosensor array device 7 by a reflection preventing member during photography in order to prevent creation of stray light or to install the photosensor array device 7 in a positional relation which is free of the creation of stray light. For example, a mechanism whereby the photosensor array device 7 is embedded during photography may be added, thereby preventing the interruption of the optical path during photography and the aforementioned creation of stray light at a time.

Designated by 8 is a reference field lens, and denoted by 9 is a total reflection mirror. Designated by 10 is a second photosensor array device installed on the imaging plane of the reference field lens 8. The first and second photosensor array devices 7 and 10 used herein are image pickup elements capable of putting out a time-serial image signal, such as CCD, BBD or MOS type sensor arrays.

In the distance detecting device of the single lens reflex camera according to the present embodiment, it is a feature that the picture-taking lens 1 is commonly used as the distance detecting standard field lens, but of course, the picture-taking lens 1 and the reference field lens 8 are in a positional relation spaced apart by a predetermined base length. The standard field image formed on the first photosensor array device 7 (hereinafter referred to as the standard field sensor) by the picture-taking lens 1 includes the standard field image formed on the second photosensor array device 10 (hereinafter referred to as the reference field sensor) by the reference field lens 8, and is purely electrically compared with a reference field image of wider range. That is, the image of the object formed on the reference field sensor 10 by the reference field lens 8 is formed on a line parallel to the base line with an amount of deviation δ corresponding to the object distance if the imaging portion on the surface of the reference field sensor in a case where a target object lying at an ideal infinite distance is supposed is 0. Accordingly, assuming that the distance to the target object is D, that the base length is B and that the distance from the rear principal surface of the reference field lens 8 to the reference field sensor 10 is f, D is represented by the following equation:

$$D = fB/\delta$$

In the above-described construction, if the image signal row (standard field signal) corresponding to the standard field from the standard field sensor 7 is compared with the image signal row (reference field signal) corresponding to the reference field put out from the reference field sensor 10 while the former image signal row is shifted relative to the latter and the position of the image position in the reference field image which can be regarded as being substantially coincident is stored as the number of shifted picture elements, then the aforementioned amount of deviation δ can be expressed as an amount capable of being electrically handled as the amount of shift of the picture element.

Figure 2:
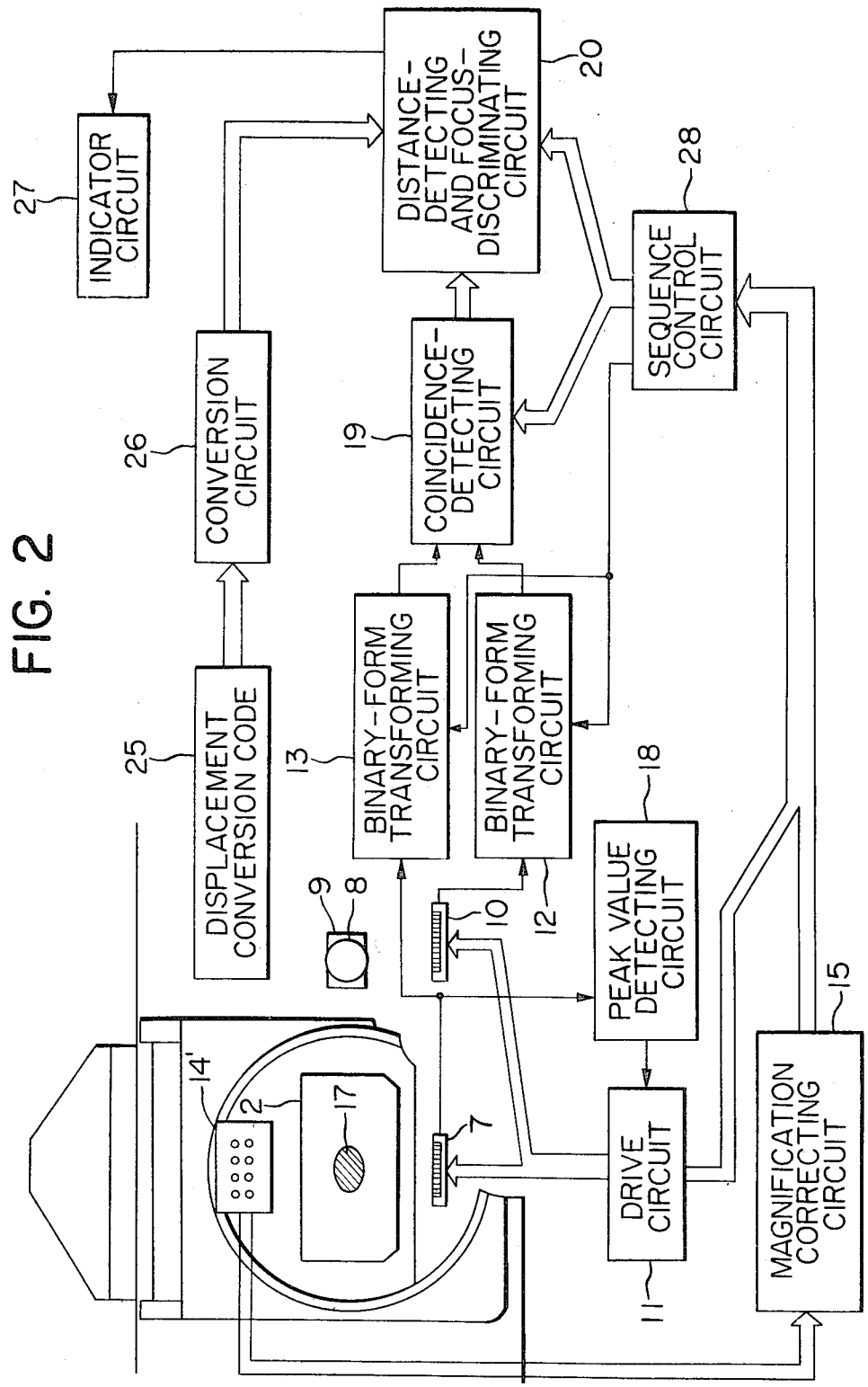
FIG. 2 is a block diagram showing the distance detecting and focus detecting electric circuit system of the camera shown in FIG. 1.

An example of the circuit for electrically detecting such amount of image deviation δ will now be described by reference to FIG. 2. In FIG. 2, reference numeral 11 designates a drive circuit for the sensors 7 and 10. Reference numerals 12 and 13 denote binary-form-transforming circuits for slicing the time-series picture element signals of the standard field and the reference field at a predetermined level and making them into binary-form-transformed image signal rows. Designated by 19 is a coincidence-detecting circuit for storing the aforementioned two binary-form-transformed image signal rows and thereafter detecting the coincidence or noncoincidence of each bit while successively relatively shifting the said image signal rows. Reference numeral 20 designates a distance-detecting and focus discriminating circuit for continuing to latch the shifted address at a point of time whereat the number of coincidences has become greater from the start of the above-described relative shift, thereby storing as the address of shift the amount of shift until the maximum number of coincidences is obtained, at a point of time whereat the above-mentioned relative shift has been terminated, and comparing it with the position information of the picture-taking lens 1 (shown in FIG. 1), thereby discriminating whether the picture-taking lens 1 is at the in-focus point or at the near-focus or at the far-focus. Designated by 25 is a displacement conversion code for putting out a signal corresponding to the displaced position of the picture-taking lens 1 in the form of gray code (digital code). Denoted by 26 is a conversion circuit for converting the alternating binary number put out in the form of gray code into a natural binary number. The position information of the picture-taking lens 1 put out from the conversion circuit 26 is latched in the memory circuit of the focus discriminating circuit 20 and compared with the aforementioned maximum coincidence number output address, whereby the deviation between the in-focus position and the picture-taking lens position is discriminated. Designated by 27 is an indicator circuit which effects indication of the in-focus point at a point of time whereat the direction of deviation or the deviation becomes zero.

The image signal rows delivered from the standard field sensor 7 and the reference field sensor 10 are repeated in the above-described manner to discriminate the in-focus, whereby the picture-taking lens 1 (FIG. 1) can be brought to a true in-focus position.

In FIG. 1, reference numeral 21 denotes a displacement conversion code for putting out the picture-taking lens position. In the present embodiment, the displacement conversion code 21 comprises a gray code formed on a flexible substrate.

Figure 3A:
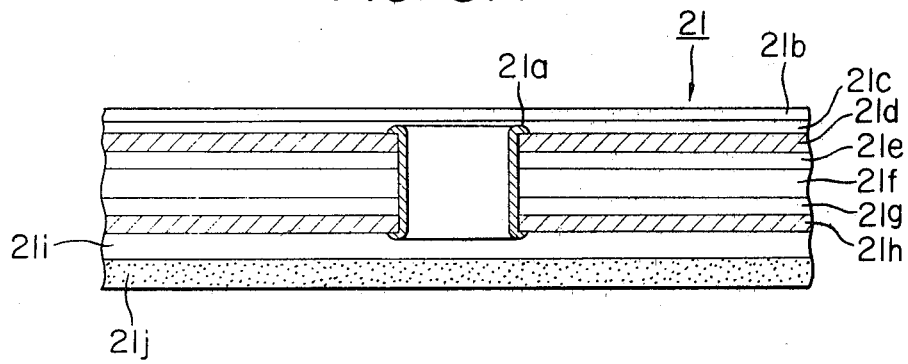
FIGS. 3A and 3B are cross-sectional views showing an example of the construction of the picture-taking lens position signal generating gray code means of the camera shown in FIG. 1.

FIG. 3 shows an example of such flexible gray code. FIG. 3A shows the details of the cross section thereof. Designated by 21f is a base plate formed of a plastic material such as glass epoxy, polyimide or polystyrene. Denoted by 21d and 21h are copper films secured to the base plate 21f by adhesive layers 21e and 21g. The copper film 21d has a gray code patterned thereon, and copper film 21h is a lineform electrode. The copper films 21d and 21h are electrically coupled together by a through-hole 21a. Designated by 21b and 21c are metal coatings using gold plating or nickel plating, these coatings being for preventing oxidation of the copper films and reducing the sliding resistance thereof. Reference numeral 21i designates an insulating sheet for insulation, and reference numeral 21j denotes an adhesive agent for adhesively securing the gray code to the lens barrel of the picture-taking lens 1.

Figure 3B:
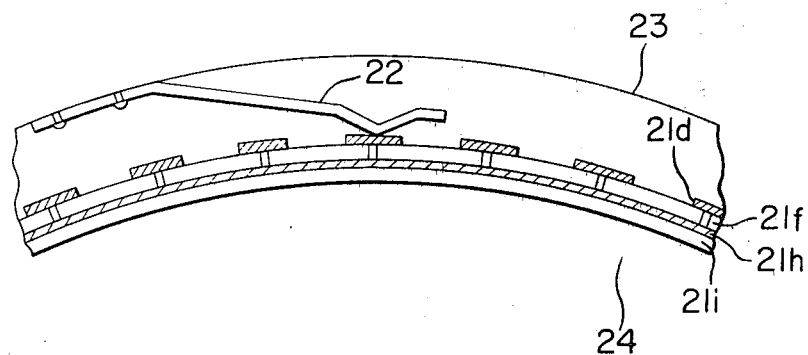

FIG. 3B shows in cross-sectional view a case where such a flexible gray code is installed on the lens barrel of the picture-taking lens 1. Designated by 23 is a movable ring which is the distance ring of the picture-taking lens 1. Denoted by 22 is a contact. The contact 22 is fixed to the movable ring 23 and, for example, when the picture-taking lens 1 is moved by a helicoid, the angle of rotation of the movable ring 23 linearly corresponds to the amount of displacement of the picture-taking lens 1. Accordingly, the position of the contact 22 corresponds to the amount of displacement entirely in one-to-one relationship. Denoted by 24 is the fixed ring of the picture-taking lens 1. The flexible gray code 21 is fixedly installed on the fixed ring 24. It will be apparent that a construction in which the contact 22 is secured to the fixed ring 24 and the flexible gray code 21 is secured to the movable ring 23 will also result in just the same effect.

In the present embodiment, the sensors 7 and 10 are driven by the same drive circuit 11, but alternatively, the sensors may of course be driven by separate drive circuits and of course, use may be made of photosensor array devices different in their driving system.

Also, where the same drive circuit 11 is used, the numbers of picture elements, the picture element array pitches and the sizes of the light receiving surfaces of the two sensors need not always be the same. If drive pulses are separately made as required, it is also possible to separately select the accumulating time and this also pertains to the common knowledge of the driving system for photosensor array device and therefore need not be described.

Description will now be made of the relation between the aperture for the standard field sensor 7 provided in the central portion of the quick return mirror 2 and the aperture for the reference field sensor 10 determined by the aperture of the reference field lens 8.

If the sensitivities and the accumulating times of the standard field sensor 7 and the reference field sensor 10 and the quantities of light from the same target object are Rs, Rr; Ts, Tr; Is, Ir, respectively, the output Vs of the standard field sensor 7 is Vs=Rs.Ts.Is and the output Vr of the reference field sensor 10 is Vr=Rr.Tr.Ir.

In the present embodiment, the standard field image shift address to the image portion in which the standard field signal row and the highest coincidence degree are obtained in the reference field signal row is the target object distance. Accordingly, the output Vs of the standard field sensor 7 and the output Vr of the reference field sensor 10 for the same target object must be coincident with each other in a practical range.

In the device of the present embodiment, the standard field sensor 7 and the reference field sensor 10 use the same drive circuit 11 and are identical in accumulating time and the sensitivities thereof are also equal in a practical range. Accordingly, the standard field optical system and the reference field optical system must be set so that the light beams entering the sensors 7 and 10 are equal in a practical range.

In FIGS. 1 and 2, reference numeral 17 designates a standard field aperture provided in the central portion of the quick return mirror 2. Desirably, the center of the standard field aperture 17 is coincident with the optical axis of the picture-taking lens 1 and a light beam of circular cross section centered at the point of intersection with the optical axis passes through the aperture 17. As previously described, the reference field aperture is set by the aperture of the reference field lens 8 or by the diameter of an adjusting fixed diaphragm annexed to the reference field lens 8, and it is desirable that the standard field image and the reference field image be identical in the manner of blurring and in the present example, this is circular and therefore, the desirable shape of the cross section of the light beam limited by the standard field aperture 17 is set to a circle. In practice, however, the shapes of the standard field and reference field apertures do not require so much precision.

Designated by 16 (shown in FIG. 1) is a diaphragm contained in the picture-taking lens 1. In the ordinary single lens reflex camera, the diaphragm 16 is open during the focusing mode. Accordingly, in the device of the present embodiment, the standard field light beam is limited only by the standard field aperture 17 and therefore, if the F-values of the standard field and the reference field are Fs and Fr, respectively, and if [transmission factor]×[reflection factor] thereof are ts and tr, respectively, then the two apertures must be set such that $ts/F^2s = tr/F^2r$ is satisfied. Using the standard field aperture 17 as a half-mirror to minimize the reduction of the quantity of viewfinder light is a very effective means in practice.

The circuit of FIG. 2 will be described again. In FIG. 2, reference numeral 18 designates a peak value detecting circuit and in the present embodiment, the peak value of the output of the standard field sensor 7 is detected by the circuit 18 and the control pulse of the charge accumulating time or the charge discarding time of the sensor 7 is controlled through the drive circuit 11 so that this peak value does not depart from a predetermined level range. In the present embodiment, the reference field sensor 10 is driven by the common drive circuit 11 and therefore, simultaneously therewith, the charge accumulating time or the charge discarding time of the reference field sensor 10 is also subjected to a similar control. Also, in the present embodiment, control is effected by the peak value of the image signal row of the standard field sensor 7, but even when this is effected by the peak value of the reference field sensor 10, a similar effect may be provided and the saturation of the sensors 7 and 10 can be prevented and the two image signal rows can always be controlled to a predetermined level.

Figure 4:
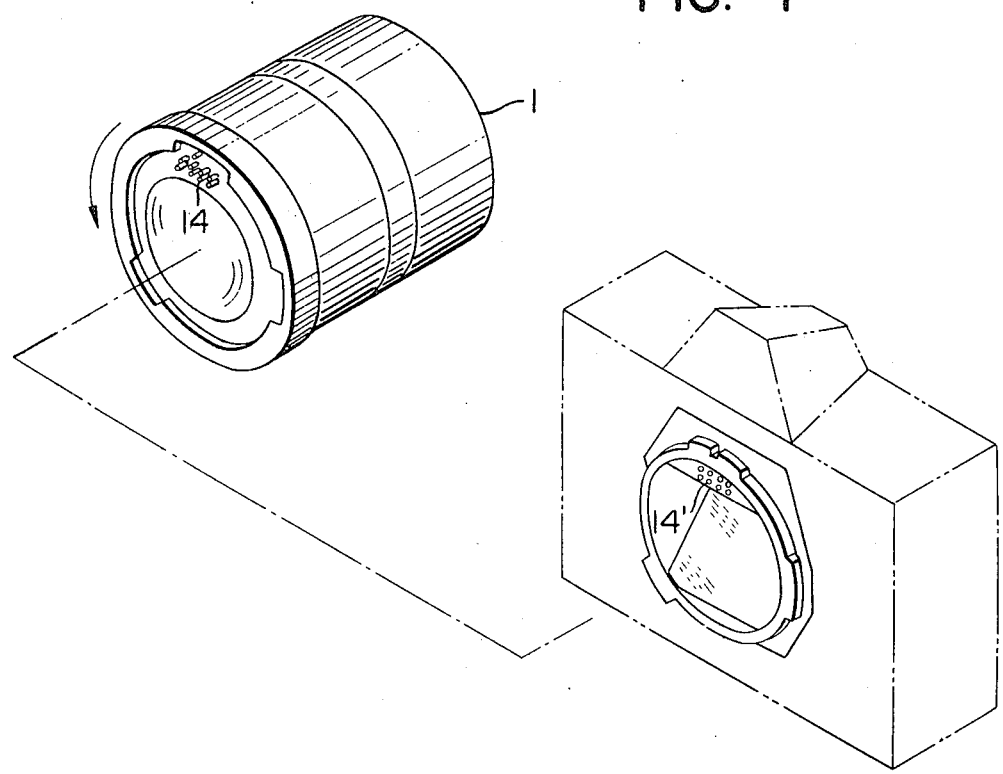
FIG. 4 is a perspective view showing an example of the construction of means for transmitting and receiving the picture-taking lens focal length information between an interchangeable type picture-taking lens and the camera body.
Figure 5:
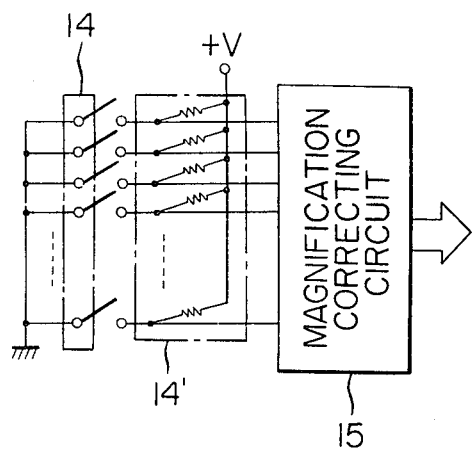
FIG. 5 is an electric circuit diagram showing the equivalent circuit of the information transmitting and receiving means shown in FIG. 4.

Next, in FIG. 4, reference numeral 14 designates focal length signal pins. The focal length of the picture-taking lens 1 is coded by the number and arrangement of pins and this may be transmitted to switches 14' installed at the position on the camera body side whereat the picture-taking lens 1 is mounted. The focal length signal pins 14 and switches 14' which constitute such a focal length conversion code are shown as an electric circuit in FIG. 5. In the present example, the focal length conversion code is constituted by the focal length signal pins 14 installed on the picture-taking lens 1, but this may of course be constituted as a photocoupler by a light-emitting element such as LED and a light-receiving element or alternatively, a coded pattern may be installed at a predetermined location on the picture-taking lens 1 and a method of recognizing this on the camera body side may be provided.

The imaging magnification of the standard field image formed on the standard field sensor 7 is determined by the focal length of the picture-taking lens 1. Accordingly, when the picture-taking lens 1 has been replaced with another lens system of different focal length, the size of the standard field image changes at an imaging magnification corresponding to the focal length. In such a situation, it becomes impossible to measure the degree of coincidence between the reference field image formed at a predetermined imaging magnification and the aforementioned standard field image. Designated by 15 is a magnification correcting circuit for operationally processing such a change in the standard field magnification on the basis of the information of the focal length conversion code of the picture-taking lens 1.

The magnification changing circuit system and the coincidence number detecting system in the present embodiment will now be described in detail.

Figure 6:
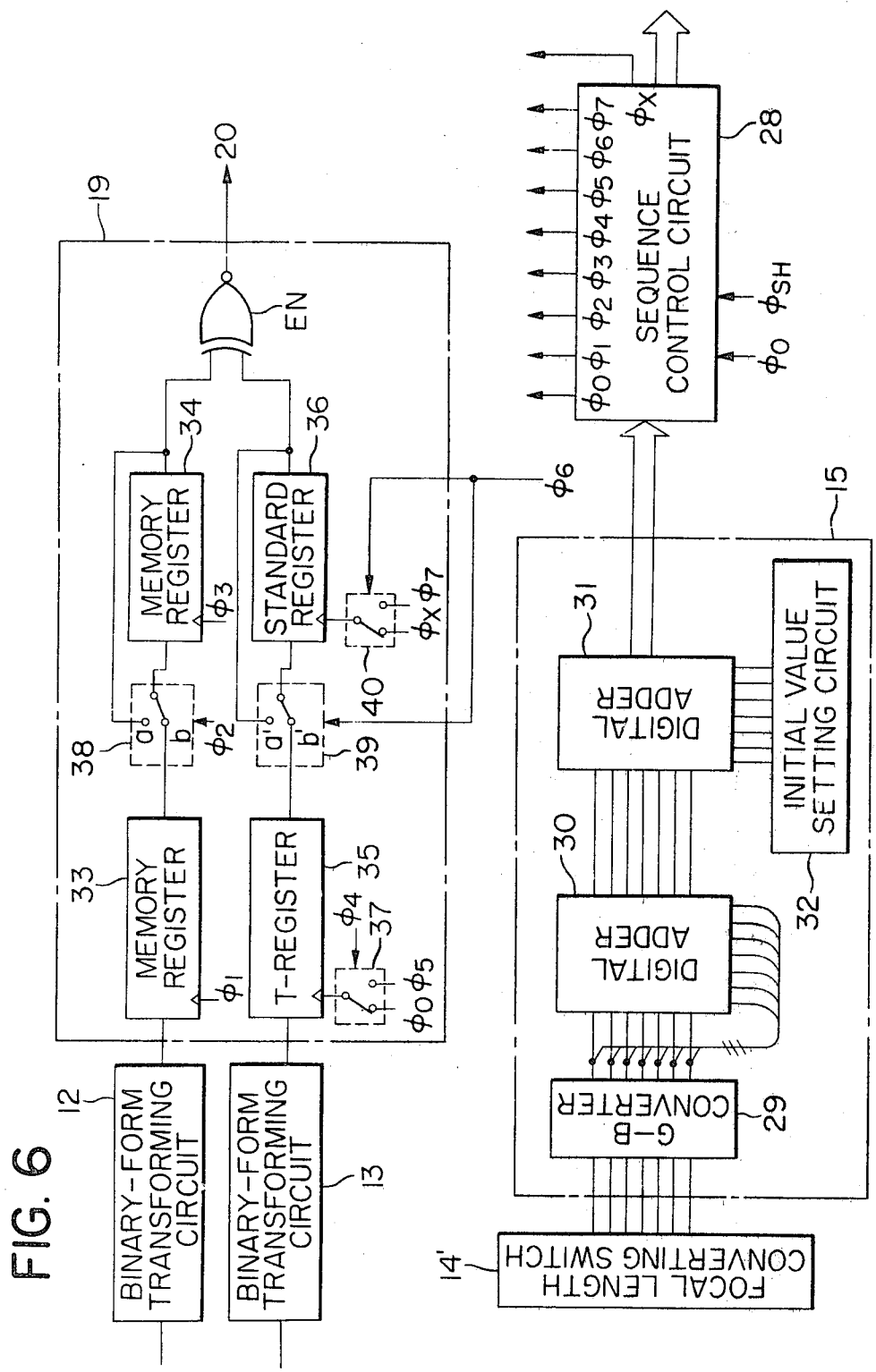
FIG. 6 is a block diagram showing an example of the magnification correcting and coincidence detecting circuit in the circuit system shown in FIG. 2.

FIG. 6 shows the magnification correcting circuit and the coincidence detecting circuit in block diagram. Reference numerals 33 and 34 designate memory registers for storing a binary-form-transformed time-series image signal corresponding to the reference field. The memory registers 33 and 34 will hereinafter be referred to as the first reference register and the second reference register, respectively. The first reference register 33 has a capacity of bit number d corresponding to the division bit number when the standard field in the reference field moves from the close range position to the infinity position or from the infinity position to the close range position correspondingly to the variation in object distance. This is equivalent to the zone number which is usually explained. The second reference register 34 has a capacity of bit number n corresponding to the predetermined standard field. Reference numeral 35 denotes a register for temporally storing a binary-form-transformed time-series image signal corresponding to the standard field. The register 35 will hereinafter be referred to as the T register. The T register 35 has Nmax bits, namely, a capacity large enough for the binary-form-transformed time-series image signal corresponding to the standard field as imaged at a magnification corresponding to the maximum value of the focal length of the picture-taking lens 1 to be all stored therein. Reference numeral 29 designates a circuit for converting the focal length code put out from the focal length conversion switch 14' into a natural binary number when such focal length code is constituted by a gray code. The circuit 29 will hereinafter be referred to as the g-B (gray-binary) converter. If the focal length information put out from the g-B converter is x, where the size of the standard field image formed by the actual picture-taking lens 1 is represented by a picture element number $N(x)$, $N(x)$ is expressed as $N(x) = q + p$, where p represents the bit number corresponding to an increase or decrease in the standard field bits relative to the variation in the focal length conversion code, and q represents the standard field bit number when $x = 0$. Designated by 30 and 31 are digital adders (hereinafter referred to as ADDI and ADDII, respectively). Reference numeral 32 denotes an initial value setting circuit for setting the initial value q of the standard field bit number when $X = 0$. In this embodiment ADDI effects the operation of $p = 2 \times x$, and ADDII effects the operation of $q + 2 \times x$ and puts out $N(x) = q + p$ and applies it as input to a sequence control circuit 28. The maximum number Nmax of the signals transformed into binary form by the standard field binary-form-transforming circuit 13 is stored by the T register 35, whereafter the operation of $\{Nmax - N(x)\}/2$ is effected in the sequence control circuit 28 from the size $N(x)$ of the standard field image operated on the basis of the information put out from the focal length conversion code 14' at that point of time, and the signal stored in the T register 35 is shifted by $\{Nmax - N(x)\}/2$ bit, whereby the heading of $N(x)$ bit of binary-form-transformed image signal row required at the current point of time is carried out. Subsequently, from the T register 35, the aforementioned headed binary-form-transformed image signal row is delivered at a clock frequency f/n frequency-divided for an arbitrary frequency f by a predetermined standard field bit number n. This is introduced into a standard register 36 having n bits of capacity at a clock pulse of frequency $f/N(x)$ frequency-divided by $N(x)$ for said arbitrary frequency f. The time required until the delivery of $N(x)$ bits of binary-form-transformed image signal row from the T register 35 is terminated in $N(x) \times 1/(f/n)$, and the time required for the introduction of the binary-form-transformed image signal row into the standard register 36 of n bits is $n \times 1/(f/N(x))$. Accordingly, delivery and introduction of the binary-form-transformed image signal row is effected without excess and deficiency between the registers 35 and 36, whereby the variation in imaging magnification of the standard field image resulting from the variation in focal length can always be handled as the binary-form-transformed image signal row reduced or enlarged to a predetermined magnitude n. After the reduced or enlarged binary-form-transformed image signal row of the standard field image has been received into the standard register 36 and the binary-form-transformed image signal row of the reference field image from the reference field binary-form-transforming circuit 12 has been received into the first and second reference registers 33 and 34, the contents of the standard register 36 and the second reference register 34 are successively delivered and coincidence or incoincidence is discriminated by a subsequent EX-NOR (exclusive-nor) circuit EN. At a point of time whereat delivery of n-bit signal row has been terminated, the contents of the standard register 36 are again returned to their original condition and the contents of the second reference register 34 are shifted by 1 bit by receiving the delivery of 1-bit signal from the first reference register 33. By such discrimination between coincidence and incoincidence and the subsequent 1 bit shift being successively repeated d times, a position substantially coincident with the standard field in the reference field can be detected and the distance to the object to be photographed can be measured in the fashion of triangular servey on the basis of the aforementioned operational equation. The distance-detecting and focus discriminating circuit 20 carries out detection of the object distance by the detection of the coincident position of such an image on the basis of the discrimination output from the EX-NOR circuit EN and further, discrimination of the in-focus of the picture-taking lens 1 with respect to the object by comparison between the detected object distance and the amount of stop-out of the picture-taking lens 1 given by the conversion circuit 26, and the construction as disclosed, for example, in U.S. application Ser. No. 121,690 filed on Feb. 15, 1980, now U.S. Pat. No. 4,329,033, issued May 11, 1982 by the assignee of the present invention is applicable as the circuit 20. Likewise, as regards the drive circuit 11, the peak value detecting circuit 18, the binary-form-transforming circuits 12 and 13 and the sequence control circuit 28 whose constructions are not described herein in particular, the constructions as disclosed in said U.S. application Ser. No. 121,690 are applicable. Designated by 37, 38, 39 and 40 are switches for controlling the sequence of the respective registers.

Figure 7A:
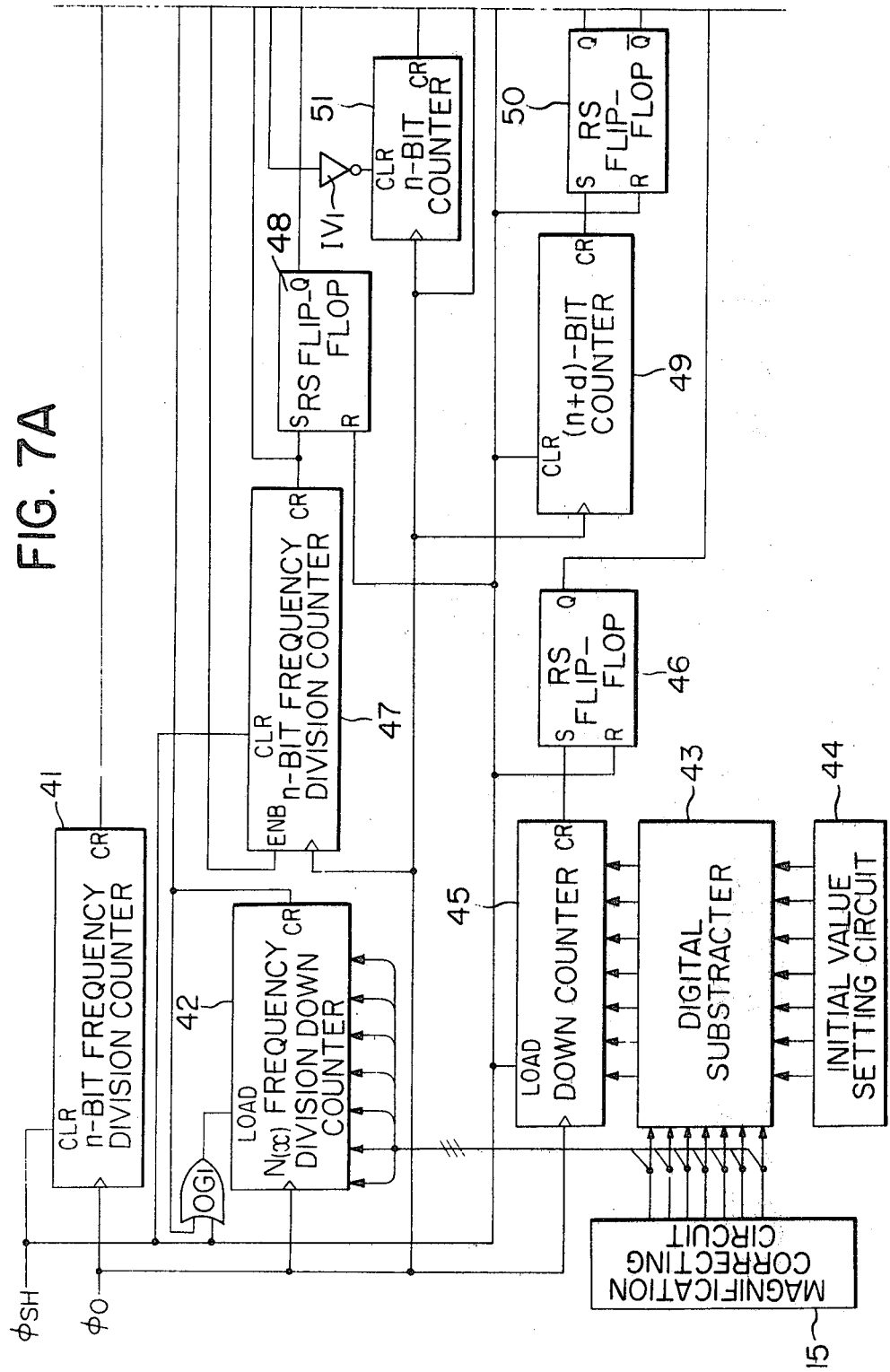
FIG. 7 is a block diagram showing the construction of a circuit portion of a sequence control circuit for the magnification correcting and concidence detecting circuit shown in FIG. 6, which circuit portion is for forming various control pulses concerning the magnification correction.

FIG. 7 shows the details of the circuit portion of the sequence control circuit 28 for the magnification correcting and coincidence detecting circuit 19 which is for forming various control pulses concerned with the magnification correction. FIG. 8 is a timing chart of these pulses. In FIG. 7, reference numeral 43 designates a digital subtracter, and reference numeral 44 denotes the initial value setting circuit of the digital subtracter 43 which initially sets 3/2 of the aforementioned Nmax. Accordingly, the digital subtracter 43 digitally subtracts ½ of N(x) put out from the magnification correcting circuit 15 from Nmax×3/2 and puts out $$\frac{3N\max - N(x)}{2}.$$

Designated by 45 is a down counter which down-counts the number preset by $$\frac{3N\max - N(x)}{2}$$

put out from the subtracter 43 and puts out a single pulse from its CR terminal as soon as it counts zero. $\phi_0$ is a pulse synchronized with the signal delivery of the standard field sensor 7, and $\phi SH$ is a shift pulse of the standard field sensor 7. The down counter 45 receives as input $$\frac{3N\max - N(x)}{2}$$

preset by $\phi SH$ and counts $\phi_0$. Denoted by 46 is an RS flip-flop circuit adapted to be set by $\phi SH$ and reset by a single pulse signal put out at a point of time whereat $$\frac{3N\max - N(x)}{2}$$

from the CR terminal of the down counter 45 has been down-counted. $\phi_4$ is a pulse indicative of the fact that the required heading of the standard field binary-form-transformed image signal row in the T register 35 has been completed by the Q output of the RS flip-flop circuit 46, and this pulse is applied as input to the mode change-over switch 37 of the T register 35 of FIG. 6 to control the timing of the shift pulse changeover. Designated by 41 is an n-bit frequency division counter cleared by $\phi SH$ for n-frequency-dividing $\phi_0$. $\phi_5$ is a clock pulse resulting from n-frequency-dividing $\phi_0$, and it is a pulse for delivering to the standard register 36 the standard field binary-form-transformed image signal row headed in the T register 35, this pulse being imparted to the switch 37 with $\phi_0$ and selectively imparted to the T register 35 by the switch 37. Designated by 42 is an N(x) frequency division down counter for down-counting the output N(x) of the magnification correcting circuit 15 by $\phi_0$ preset and input at the timing of $\phi SH$. $\phi_x$ is a pulse train put out from the CR terminal of the N(x) frequency division down counter 42 simultaneously with N(x) down count, and it is a standard register memory pulse for successively storing in the standard register 36 the signal pulses delivered from the T register by $\phi_5$. $\phi_x$ is input to the N(x) frequency division down counter 42 through an OR circuit OG1 with $\phi SH$ and after $\phi SH$ has generated a single pulse, N(x) is preset and input each time $\phi_x$ generates a single pulse. Reference numeral 49 denotes an (n+d) bit counter which n+d bit-counts $\phi_0$ after having been cleared by $\phi SH$. Designated by 50 is an RS flip-flop circuit adapted to the reset by $\phi SH$ and thereafter set by a carry put out from the (n+d) bit counter 49. By the carry being put out from the (n+d) bit counter 49, it can be seen that the storage of the binary-form-transformed image signal row of the reference field into the first reference register 33 of d bits and the second reference register 34 of n bits has been completed. Designated by 47 is an n-bit frequency division counter for producing a magnification correction storage completion signal for n-bit-counting the pulse resulting from frequency-dividing $\phi_0$ put out from the down counter 42 into 1/N(x), thereby indicating that the shift from the T register 35 to the n-bit standard register 36 with the binary-form-transformed image signal row of the standard field being subjected to the magnification correcting process has been completed, and after having been cleared by $\phi SH$, it n-bit-counts a clock pulse $\phi_0$ synchronized with the output signal of an AND circuit AG1 which receives the T register heading completion signal $\phi_4$ and the memory pulse $\phi_x$ to the standard register 36. Denoted by 48 is an RS flip-flop adapted to be reset by $\phi SH$ and set by the carry signal of the n-bit frequency-division counter 47. The Q output of the RS flip-flop 48 provides a magnification correction termination signal, and the output signal $\phi_6$ of an AND circuit AG2 which receives this termination signal and the first and second reference register storage completion signal which is the Q output of an RS flip-flop 50 is applied to switches 39 and 40 (shown in FIG. 6) as a control pulse for changing over the coincidence-incoincidence comparison determination mode of the standard register 36 and the signal storage mode from the T register 35.

In FIG. 6, $\phi_2$ is a pulse for controlling the switch between the first reference register 33 of d bits and the second reference register 34 of n bits. When the reference field binary-form-transformed image signal row is to be successively stored, the switch 38 is connected to the b side, and when the contents of the standard register 36 of n bits and the coincidence or incoincidence are to be compared and determined, the switch 38 is connected to the a side, and after termination of the comparison of one period, the switch 38 is connected to the b side to introduce 1-bit signal from the first reference field register 33 and after the switch 38 is subsequently connected to the a side, coincidence and incoincidence are again compared and determined, and the pulse $\phi_2$ effects a control in which such operation is repeated d times.

In FIG. 7, reference numeral 51 designates an n-bit counter which is released from the clear (by the output of inverter IV1) as soon as the comparison determination mode and storage mode change-over control pulse $\phi_6$ of the standard register 36 is put out, to n-bit-count the clock pulse $\phi_0$ and put out a one-period comparison termination signal. A pulse $\phi_2$ for controlling the changeover of the storage mode and the comparison determination mode of the reference register 34 is prepared by the output signal of an OR circuit OG2 which receives the carry output of the n-bit counter 51 and the $\overline{Q}$ output of the RS flip-flop 50. $\phi_1$ and $\phi_3$ are pulses for driving the first reference register 33 of d bits and the second reference field register 34 of n bits, respectively, and $\phi_3$ is the result of the logic product of the output of an OR circuit OG3 which receives $\phi_6$ and the $\overline{Q}$ output of the RS flip-flop 50 and the clock pulse $\phi_0$ having been taken by an AND circuit AG3. $\phi_1$ is the result of the logic product of $\phi_3$ and $\phi_2$ having been taken by an AND circuit AG4. $\phi_7$ is a driving pulse when the N-bit standard register 36 has assumed the comparison determination mode, and is the result of the logic product of a pulse inverted by inverter IV2 and $\phi_3$ having been taken by an AND circuit AG5. Designated by 52 is a d-bit counter for counting the number of times over which the period during which the contents of the n-bit standard register 36 and the contents of the second reference register 34 of n-bits are compared for each signal bit successively imparted is repeated. Denoted by 53 is an RS flip-flop adapted to be reset by $\phi$SH and thereafter set by the carry output of the d-bit counter 52. The d-bit counter 52 is cleared by the carry output of the n-bit frequency division counter 47 for the magnification correction termination signal pulse output, whereafter it counts the clock pulse $\phi_0$ synchronized with the output of an AND circuit AG6 which receives the $\overline{Q}$ output of the RS flip-flop 53 and the carry output of the n-bit counter 51 for the comparison termination signal pulse output of one period. A shift address providing the maximum degree of coincidence during all the successive shifts of d-1 times is latched by a carry signal $\phi_L$ put out from the d-bit counter 52 as a simple pulse after d-bit count.

Figure 9:
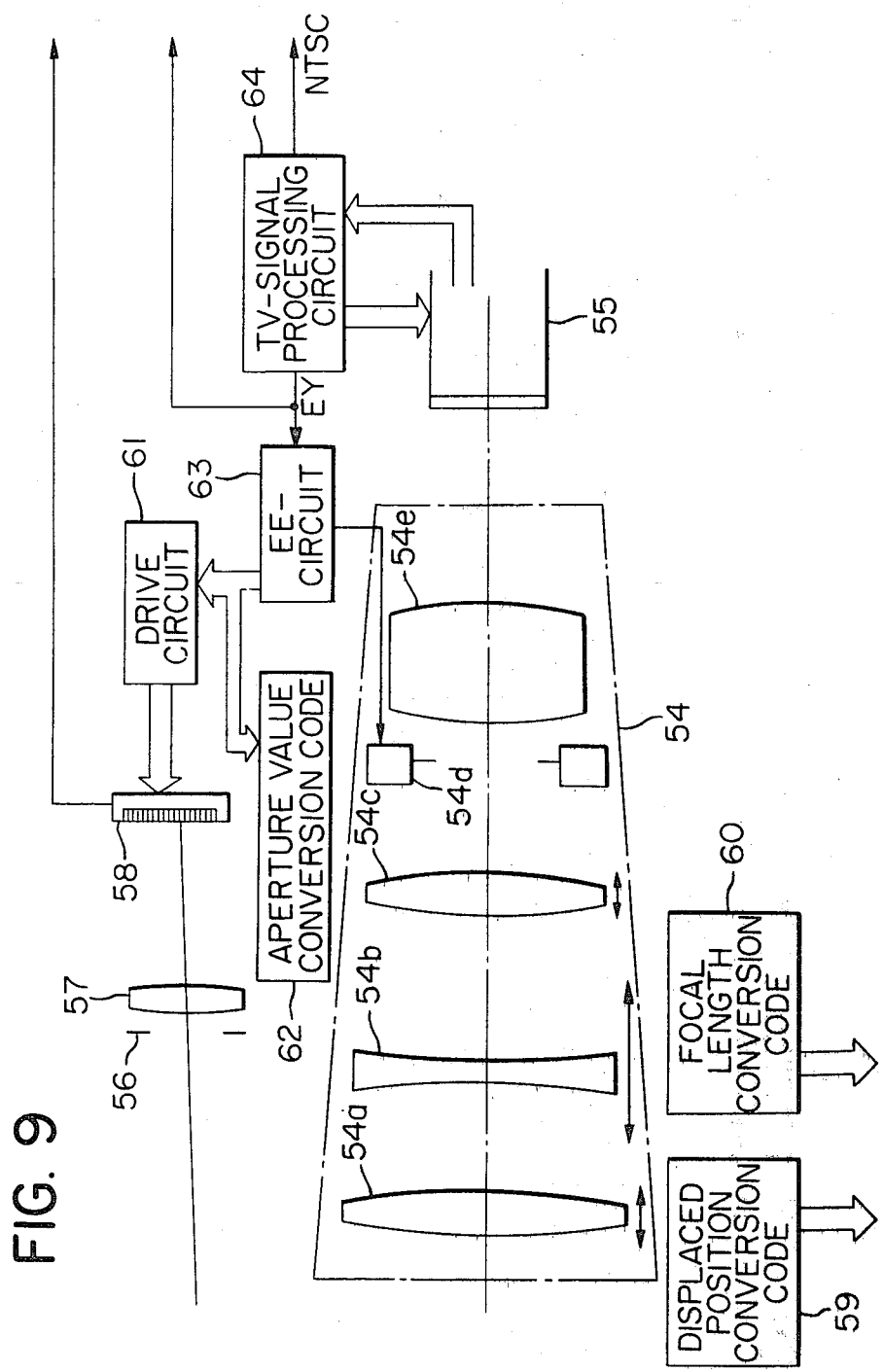
FIG. 9 is a schematic view showing an example in which the present invention is applied to a TV camera.

Finally, FIG. 9 schematically shows an example of the case where the distance detecting device according to the present invention is applied to an ordinary TV camera provided with a zoom lens.

In FIG. 9, reference numeral 54 designates the image pickup zoom lens of the TV camera. Reference numeral 54a denotes the focus lens system of the image pickup lens 54, reference numeral 54b designates the magnification changing lens system of said image pickup lens, and reference numeral 54c denotes the correcting lens system of said image pickup lens. Reference numeral 54d designates the diaphragm of the image pickup lens 54, and reference numeral 54e denotes the relay lens system of said image pickup lens. Designated by 55 is an image pickup tube such as plan vicon or vidicon or a solid state image pickup element such as two-dimensional CCD. The image pickup for TV signals is effected by an image pickup system constituted by the image pickup zoom lens 54 and the image pickup element 55, and a predetermined portion of the image pickup picture plane is used as a standard field picture plane. Designated by 57 is a reference field lens. The reference field lens 57 should desirably be installed such that the first principal plane thereof is coincident with the first principal plane of the focus lens system 54a of the image pickup zoom lens system 54 when the focus lens system 54a has been set to a ½ displaced position. However, even if the installed position of the reference field lens 57 is more or less deviated from said installed position for the convenience of design, a bad effect will not be produced in practice and therefore, said installed position is not restrictive. Reference numeral 56 designates a fixed diaphragm for adjusting the aperture of the reference field lens 57. Denoted by 58 is a photosensor array device for the reference field. The reference field sensor 58 should desirably be installed at a position whereat an object lying at a distance corresponding to the ½ displaced position of the focus lens system 54a is imaged most sharply. Also, the reference field lens 58 is of course installed at a position whereat a predetermined standard field portion of the image pickup element 55 and a base line range finder are constructed. In the present embodiment, one line of the scanning image signal in the portion orthogonal to the optical axis of the image pickup zoom lens 54 or one line in the vicinity thereof is set as the standard field picture plane, and the number of picture elements included in the length of the picture plane corresponding to a case where the length of the standard field picture plane becomes greatest relative to a predetermined distance detection field angle, namely, a case where the image pickup zoom lens 54 photographs at the longest focal length an object lying at a close range, is set as said Nmax.

In contrast, in the reference field sensor 58, a shift bit number d matching the required distance detection accuracy is taken and further, n+d bits where n is the number of picture elements included in the length of the reference field sensor corresponding to the distance detection field angle is the actually used length of the reference field sensor 58.

Designated by 59 is the displaced position conversion code of the image pickup zoom lens 54. Denoted by 60 is a focal length conversion code concerned with zoom lens portions 54b and 54c to put out the focal length variation by zooming as coded focal length information. Reference numeral 61 designates a drive circuit for driving and controlling the reference field sensor 58. Reference numeral 64 denotes a known TV-camera circuit for driving and controlling the image pickup element 55 and effecting the TV-signal processing. A standard TV-signal is of course put out from the known TV-camera circuit 64 and a brightness signal is input as the standard field image signal row to the in-focus point detecting circuit from the TV-camera circuit. Designated by 63 is an EE circuit for automatically controlling the diaphragm 54d. An aperture value signal is put out from the EE circuit 63 and input to the drive circuit 61 of the reference field sensor 58 to control the charge accumulating time or the charge discarding time of the reference field sensor 58. The aperture value of the adjusting fixed diaphragm 56 for setting the aperture of the reference field lens 57 when the diaphragm 54d of the image pickup zoom lens 54 is open is as described in detail in connection with the previously described embodiment. It is necessary to control the gain of the reference field sensor 58 correspondingly to the change of the aperture value of the image pickup zoom lens 54 from its open condition and make it identical to the output level of said brightness signal. For this purpose, the charge accumulating time or the charge discarding time of the reference field sensor 58 is controlled on the basis of the diaphragm position signal put out from the EE circuit 63. Denoted by 62 is an aperture value conversion code for putting out the aperture value information when the diaphragm 54d is manually adjusted.

Each of the conversion codes 59, 60 and 62 for the lens displaced position, focal length and aperture value may be constituted by a combination similar to the combination (shown in FIG. 1) of the lens displacement conversion code 21 and the contact 22 used in the previously described embodiment.

As described above in detail, in the distance detecting device of a camera according to the present invention, the picture-taking optical system of the camera is commonly used as one of the distance detecting optical systems, preferably, as the standard field optical system, thereby enabling any optical parallax to be entirely eliminated and moreover, the necessity of installing the standard field optical system separately is eliminated, thereby enabling the camera to be provided with a distance detecting device which is compact and light in weight as well as high in utility.

Incidentally, the difference in imaging magnification between the standard field optical system and the reference field optical system and the fluctuation of imaging magnification which necessarily arise from the fact that the picture-taking optical system serves also as the standard field optical system can be completely overcome by a magnification correcting system wherein, as shown in the embodiment, a register is provided for temporally storing the standard field image information, heading of the required standard field image information is effected on the basis of the focal length conversion code information, and the ratio of delivery and writing speed of the time-series image information to a standard field register of a predetermined capacity is operationally processed on the basis of the focal length conversion code information, whereby it is always enlarged or reduced into time-series image information of a predetermined bit number, and accordingly distance detection of high accuracy is made possible.

An application of the present invention to a TV camera has been described with respect to a case where a portion of the image pickup element for TV picture plane serves also as the standard field sensor, but it is of course possible to install the standard field sensor at a position in a plane conjugate with the imaging plane of the focusing lens system so that part of the light beam by the focusing system is incident and imaged on the surface of the standard field sensor, thereby preventing the variation in focal length and the variation in aperture value by the zooming of the picture-taking lens from affecting the standatd field image.

It is also possible to select the wavelength ranges of the standard field light beam and the reference field light beam by a member such as an intervening mirror or filter to thereby make the picture-taking light beam wavelength range differ from said wavelength ranges, thereby reducing the influence of the reduction or aggravation of the light beam used in the picture-taking and optical viewfinder.

While the present invention has been described with respect to the applications thereof to a single lens reflex camera and a TV camera, the invention is also widely applicable to other photographing optical instruments which require object distance information.

What is claimed is:

1. In a camera having a picture-taking lens means, a system for detecting the distance between the camera and an object, comprising:
 (A) a first image signal forming means for forming an electrical signal relating to a first detection image obtained by an image of said object formed by said picture-taking lens means;
 (B) a range-finding optical means disposed to form an image of said object in accordance with a path different from the object image formed by said picture-taking lens means;
 (C) a second image signal forming means for forming an electrical signal relating to a second detection image obtained by the object image formed by said range-finding optical means;
 the relative positional relation between said first and second detection images varying in accordance with the change in the distance between the camera and the object; and
 (D) circuit means for receiving said electrical signals formed by said first and second image signal forming means and for producing an output indicative of the relative positional relation between said first and second detection images.

2. The distance detecting system according to claim 1, further comprising:
 compensation means for compensating for the difference in imaging between said first and second detection images, said compensation means being arranged to act on said circuit means to effect said compensation in said circuit means.

3. The distance detecting system according to claim 2, wherein said compensation means includes means for detecting the focal length of said picture-taking lens means.

4. The distance detecting system according to claim 3, wherein said picture-taking lens means has means for representing the focal length of the lens means, and said detecting means in said compensation means is arranged to read the focal length represented by said representing means of the lens means.

5. The distance detecting system according to claim 3 wherein said picture-taking lens means includes means adjustable for varying the focal length of the lens means, and said detecting means in said compensation means is arranged to detect the adjusted state of said adjustable means in the lens means.

6. The distance detecting system according to claim 1, 2, 3, 4 or 5, further comprising:
 detection image forming optical means arranged relative to the picture-taking lens means to form said first detection image by utilizing part of the imaging light beam from said picture-taking lens means.

7. The distance detecting system according to claim 6, wherein said first image signal forming means includes means for scanning said first detection image formed by said detection image forming means.

8. The distance detecting system according to claim 7, wherein said second image signal forming means includes means for scanning said second detection image obtained by the object image formed by said range-finding optical means.

9. The distance detecting system according to claim 1, 2, 3, 4 or 5, wherein said camera further has video signal generating means for generating a video electrical signal indicative of the object image formed by said picture-taking lens means, and said first image signal forming means is arranged to form said electrical signal relating to the first detection image by utilizing at least a portion of said video electrical signal generated by said video signal generating means.

10. The distance detecting system according to claim 9, wherein said second image signal forming means includes means for scanning said second detection image obtained by the object image formed by said range-finding optical means.

11. The distance detecting system according to claim 1, 2, 3, 4 or 5, wherein said range-finding optical means is disposed at a position leaving a predetermined base line length from said picture-taking lens means so that the relative positional difference becomes a measure of the distance between the camera and the object.

12. A system for detecting the distance to an object, comprising:
   (A) first and second optical means arranged to form first and second detection images of said object in such a manner that the relative positional relation between said first and second images varies with the change in the distance to the object, said first and second optical means having different imaging characteristics;
   (B) signal forming means for forming electrical signals related to said first and second detection images formed by said first and second optical means;
   (C) circuit means for receiving said electrical signals formed by said signal forming means and for producing an output indicative of the relative positional relation between said first and second images formed by said first and second optical means; and
   (D) compensation means for compensating the difference in imaging characteristics between said first and second optical means, said compensation means being arranged to act on said circuit means to effect said compensation in the circuit means.

13. The distance detecting system according to claim 12, wherein said first and second optical means each has a different focal length, and said compensation means is arranged to effect the compensation for the difference in the focal length between said first and second optical means.

14. The distance detecting system according to claim 13, wherein said compensation means includes means for detecting the focal length of one of said first and second optical means.

15. The distance detecting system according to claim 14, wherein said one optical means has means for representing the focal length thereof, and said detecting means in said compensation means is arranged to read the focal length represented by said representing means of said one optical means.

16. The distance detecting system according to claim 14, wherein said one optical means includes means adjustable for varying the focal length thereof, and said detecting means in said compensation means is arranged to detect the adjusted state of said adjustable means in said one optical means.

17. A camera comprising:
   (A) a picture-taking optical system for forming a primary image of an object;
   (B) a range-finding optical system for forming a range-finding image of the object, said range-finding optical system being disposed at a position a predetermined length from said picture-taking optical system so that the relative positional relation between said primary image and said range-finding image varies with the change in the distance from the camera to the object;
   (C) image pick-up means for receiving the primary image formed by said picture-taking optical system and for producing an electrical signal related to the primary image;
   (D) image sensing means for receiving the range-finding image formed by said range-finding optical system and for producing an electrical signal related to the range-finding image;
   (E) first circuit means for receiving the electrical signal produced from said image pick-up means and for producing a video signal indicative of said primary image formed by said picture-taking optical system; and
   (F) second circuit means for receiving a portion of said video signal produced from said first circuit means and the electrical signal produced from said image sensing means and for producing an output indicative of the relative positional relation between said primary image and said range-finding image.

18. The camera according to claim 17, further comprising:
   compensation means for compensating the difference in imaging between said primary image and said range-finding image, said compensation means being arranged to act on said second circuit means to effect said compensation in the second circuit means.

19. The camera according to claim 18, wherein said compensation means includes means for detecting the focal length of said picture-taking optical system.

20. The camera according to claim 19, wherein said picture-taking optical system is of variable focal length type and includes means adjustable for varying the focal length thereof, and said detecting means in said compensation means is arranged to detect the adjusted state of said adjustable means in said picture-taking optical system.

21. The camera according to claim 17 or 18 or 19 or 20, wherein said image pick-up means and said image sensing means are of image scanning type.

22. The camera according to claim 21, wherein said image pick-up means and said image sensing means are of solid state type.

23. The camera according to claim 22, wherein said image pick-up means is of two dimensional type.

24. The camera according to claim 23, wherein said image sensing means is of one dimensional type.

25. The camera according to claim 22, wherein said image sensing means is of one dimensional type.

* * * * *